(12) United States Patent
Klappert et al.

(10) Patent No.: US 12,395,701 B2
(45) Date of Patent: Aug. 19, 2025

(54) METHODS AND SYSTEMS FOR DISTRIBUTING MEDIA GUIDANCE AMONG MULTIPLE DEVICES

(71) Applicant: Adeia Guides Inc., San Jose, CA (US)

(72) Inventors: Walter R. Klappert, North Hollywood, CA (US); Donn Smith, New York, NY (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/222,585

(22) Filed: Jul. 17, 2023

(65) Prior Publication Data

US 2023/0388588 A1 Nov. 30, 2023

Related U.S. Application Data

(63) Continuation of application No. 17/942,578, filed on Sep. 12, 2022, now Pat. No. 12,238,375, which is a continuation of application No. 17/390,501, filed on Jul. 30, 2021, now Pat. No. 11,477,529, which is a continuation of application No. 16/860,283, filed on Apr. 28, 2020, now Pat. No. 11,109,100, which is a continuation of application No. 16/211,729, filed on Dec. 6, 2018, now Pat. No. 10,674,212, which is a continuation of application No. 14/570,130, filed on Dec. 15, 2014, now Pat. No. 10,187,692.

(51) Int. Cl.
*H04N 21/45* (2011.01)
*H04N 21/482* (2011.01)

(52) U.S. Cl.
CPC ..... *H04N 21/4532* (2013.01); *H04N 21/4516* (2013.01); *H04N 21/4821* (2013.01)

(58) Field of Classification Search
CPC ......... H04N 21/42219; H04N 21/4222; H04N 21/42222; H04N 21/42225; H04N 21/4227; H04N 2005/4423; H04N 2005/4425
See application file for complete search history.

(56) References Cited

U.S. PATENT DOCUMENTS

| | | |
|---|---|---|
| 6,104,334 A | 8/2000 | Allport |
| 6,388,714 B1 | 5/2002 | Schein et al. |
| 6,756,997 B1 | 6/2004 | Ward et al. |
| 7,134,130 B1 | 11/2006 | Thomas |

(Continued)

FOREIGN PATENT DOCUMENTS

| | | |
|---|---|---|
| WO | 2007036891 A2 | 4/2007 |
| WO | 2009067670 A1 | 5/2009 |

OTHER PUBLICATIONS

Alex Darrow: Design Guidelines for Technology-Mediated Social Interaction in a Presence Sensing Physical Space (Jan. 1, 2007), XP002625707.

(Continued)

*Primary Examiner* — Fernando Alcon
(74) *Attorney, Agent, or Firm* — HALEY GUILIANO LLP

(57) ABSTRACT

Methods and systems are disclosed herein for a media guidance application that distributes media guidance application operations between multiple devices based on one or more criteria associated with those devices. For example, the media guidance application may determine the plurality of operations performed by a target device and distribute the plurality of operations among devices near that target device.

15 Claims, 5 Drawing Sheets

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,255,825 B2 * | 8/2012 | Morris | G06F 3/1454 715/862 |
| 8,819,116 B1 | 8/2014 | Tomay et al. | |
| 11,109,100 B2 | 8/2021 | Klappert et al. | |
| 2002/0059588 A1 | 5/2002 | Huber et al. | |
| 2002/0174430 A1 | 11/2002 | Ellis et al. | |
| 2002/0194566 A1 | 12/2002 | Bellier et al. | |
| 2002/0194586 A1 | 12/2002 | Gutta et al. | |
| 2003/0110499 A1 | 6/2003 | Knudson et al. | |
| 2004/0233239 A1 | 11/2004 | Lahdesmaki | |
| 2005/0066066 A1 | 3/2005 | Karaoguz et al. | |
| 2005/0251827 A1 | 11/2005 | Ellis et al. | |
| 2006/0025168 A1 | 2/2006 | Lee et al. | |
| 2007/0033607 A1 | 2/2007 | Bryan | |
| 2007/0240182 A1 | 10/2007 | Callahan | |
| 2008/0046930 A1 | 2/2008 | Koch et al. | |
| 2008/0074546 A1 | 3/2008 | Momen | |
| 2008/0098429 A1 * | 4/2008 | Urabe | H04N 7/163 725/39 |
| 2008/0278635 A1 | 11/2008 | Hardacker et al. | |
| 2008/0281718 A1 | 11/2008 | Morgan | |
| 2009/0052859 A1 | 2/2009 | Greenberger et al. | |
| 2009/0059090 A1 | 3/2009 | Fan et al. | |
| 2009/0087039 A1 | 4/2009 | Matsuura | |
| 2009/0210898 A1 | 8/2009 | Childress et al. | |
| 2009/0281643 A1 | 11/2009 | Higuchi et al. | |
| 2010/0088630 A1 * | 4/2010 | Morris | G06F 3/1454 715/781 |
| 2010/0222102 A1 | 9/2010 | Rodriguez | |
| 2011/0159929 A1 | 6/2011 | Karaoguz et al. | |
| 2011/0185437 A1 | 7/2011 | Tran et al. | |
| 2011/0211114 A1 | 9/2011 | Cooper | |
| 2011/0294426 A1 * | 12/2011 | Matsubara | H04N 21/43637 455/41.2 |
| 2012/0119998 A1 * | 5/2012 | Sato | H04N 21/41407 345/169 |
| 2012/0151217 A1 | 6/2012 | Porter et al. | |
| 2012/0169883 A1 * | 7/2012 | Chang | H04N 21/23418 348/E7.085 |
| 2012/0281141 A1 | 11/2012 | Kitazato et al. | |
| 2013/0061267 A1 | 3/2013 | Cansino et al. | |
| 2013/0104160 A1 | 4/2013 | Beeson et al. | |
| 2013/0111514 A1 | 5/2013 | Slavin et al. | |
| 2013/0128119 A1 | 5/2013 | Madathodiyil et al. | |
| 2013/0141331 A1 | 6/2013 | Shiu et al. | |
| 2013/0152139 A1 | 6/2013 | Davis et al. | |
| 2013/0162502 A1 * | 6/2013 | Lee | H04N 21/4424 345/1.2 |
| 2013/0173765 A1 | 7/2013 | Korbecki | |
| 2013/0176204 A1 | 7/2013 | Higuchi et al. | |
| 2013/0194503 A1 | 8/2013 | Yamashita | |
| 2013/0311918 A1 | 11/2013 | Mccoy et al. | |
| 2013/0321462 A1 | 12/2013 | Salter et al. | |
| 2013/0347024 A1 | 12/2013 | Sugiue | |
| 2014/0002389 A1 | 1/2014 | Kim et al. | |
| 2014/0195653 A1 | 7/2014 | Alexander et al. | |
| 2014/0282745 A1 | 9/2014 | Chipman et al. | |
| 2014/0359647 A1 * | 12/2014 | Shoemake | H04N 21/6582 725/10 |
| 2015/0042682 A1 | 2/2015 | Jensen et al. | |
| 2015/0086174 A1 | 3/2015 | Abecassis et al. | |
| 2015/0113567 A1 * | 4/2015 | Scheer | H04N 21/42209 725/44 |
| 2015/0135238 A1 | 5/2015 | Wickenkamp | |
| 2015/0189356 A1 | 7/2015 | Shen | |
| 2015/0237412 A1 | 8/2015 | Shimy et al. | |
| 2015/0256866 A1 | 9/2015 | Finnerty et al. | |
| 2015/0281774 A1 | 10/2015 | Atkin | |
| 2015/0326921 A1 | 11/2015 | Makovetsky et al. | |
| 2015/0382066 A1 | 12/2015 | Heeter et al. | |
| 2016/0127786 A1 | 5/2016 | Langer | |
| 2016/0231917 A1 * | 8/2016 | Lee | G06F 3/04842 |
| 2022/0021936 A1 | 1/2022 | Klappert et al. | |
| 2022/0329905 A1 * | 10/2022 | Kalish | H04N 21/6587 |
| 2023/0007345 A1 | 1/2023 | Klappert et al. | |

OTHER PUBLICATIONS

U.S. Appl. No. 17/942,578, filed Sep. 12, 2022, Walker R. Klappert.

* cited by examiner

METHODS AND SYSTEMS FOR DISTRIBUTING MEDIA GUIDANCE AMONG MULTIPLE DEVICES

CROSS-REFERENCE TO RELATED APPLICATIONS

This application is a continuation of U.S. patent application Ser. No. 17/942,578, filed Sep. 12, 2022, which is a continuation of U.S. patent application Ser. No. 17/390,501, filed Jul. 30, 2021, now U.S. Pat. No. 11,477,529, which is a continuation of U.S. patent application Ser. No. 16/860,283, filed Apr. 28, 2020, now U.S. Pat. No. 11,109,100, which is a continuation of U.S. patent application Ser. No. 16/211,729, filed Dec. 6, 2018, now U.S. Pat. No. 10,674,212, which is a continuation of U.S. patent application Ser. No. 14/570,130, filed Dec. 15, 2014, now U.S. Pat. No. 10,187,692, which are hereby incorporated by reference herein in their entireties.

BACKGROUND

In conventional systems, users are able to access media on many types of devices upon which they previously could not. For example, the rise in mobile technology has allowed users to access television content on many devices other than traditional television sets. Moreover, in many cases, users may use one device to control or complement the presentation of content on another device. For example, users may use a tablet computer to control a set-top box and/or television. However, having multiple devices control a single device creates conflicts between users as a user attempts to control the single device according to his needs.

SUMMARY

Accordingly, methods and systems are disclosed herein for a media guidance application that distributes media guidance application operations between multiple devices based on one or more criteria associated with those devices. For example, the media guidance application may determine that a target device (e.g., a set-top box) may perform a first media guidance application operation (e.g., a volume control) and a second media guidance application operation (e.g., a program selection control). The media guidance application may also determine that there are currently two devices available that may cause the target device to execute the media guidance application operations. The media guidance application may then distribute the media guidance application operations between the two devices (e.g., one device manages the first media guidance application operation and the other device manages the second media guidance application operation).

Additionally, the media guidance application may determine which of the devices should manage each media guidance application operation based on one or more criteria associated with each device. For example, one device may be associated with a user that prefers to manage the first media guidance application operation and the other device may be associated with a user that prefers to manage the second media guidance application operation. In such cases, the media guidance application may assign the first user device control over the first media guidance application operation and assign the second user device control over the second media guidance application operation.

In some aspects, a media guidance application may determine (e.g., via control circuitry) that a first user device has entered a viewing area of a second user device. For example, the media guidance application may determine that one or more devices (e.g., a smartphone, tablet computer, wearable electronic device, etc.) are within a predetermined proximity to a target device (e.g., a set-top box and/or television).

In response to determining that the first user device has entered the viewing area of the second user device, the media guidance application may select (e.g., via control circuitry) a media guidance application operation available on the second user device. For example, the media guidance application may access a database (e.g., located at storage circuitry) that lists all the media guidance applications that are currently available or will become available for performance on the target device.

The media guidance application may then retrieve a device profile (e.g., from storage circuitry) for the first user device that lists a criterion for options, presented on the first user device, for performing media guidance application operations on the second user device. For example, a device profile may store one or more criteria that the media guidance application may use to determine what, if any, media guidance application operations for the target device should be managed by the first user device.

The media guidance application may then compare the media guidance application operation to the criterion to determine whether or not to present an option, on the first user device, for performing the media guidance application operation on the second user device. For example, the media guidance application may determine if the media guidance application operation for the target device should be managed by the first user device. The media guidance application may base the determination on whether or not the media guidance application operation meets the criteria. For example, the media guidance application may cross-reference the media guidance application operation with a database listing criteria met by the media guidance application operation to determine whether the media guidance application operation meets the criterion.

The media guidance application may then generate for display on the first user device the option based on the comparison. For example, if the media guidance application determines that the first user device should manage the media guidance application operation for the target device, the media guidance application may cause an option for that media guidance application operation to appear on a display screen associated with the first user device.

In some embodiments, the media guidance application may consider whether or not other devices are currently in the viewing area of the target device and whether or not those other devices are currently managing one or more media guidance application operations for the target device. For example, if the media guidance application determines that an option for a particular media guidance application operation is already generated for display on a third user device (or already generated for display on a maximum number of other devices), the media guidance application may select a different media guidance application operation available for the target device for the third user device to manage. In such cases, the media guidance application may cause an option associated with the different media guidance application operation to be generated for display on the third user device.

In another example, if the media guidance application determines that an option for a particular media guidance application operation is already generated for display on a third user device (or already generated for display on a maximum number of other devices), the media guidance application may determine whether or not to stop generating for display the option on the third user device and start generating for display the option on the first user device. For example, the media guidance application may compare priority designations associated with each of the first user device and the third user device to determine which device should have priority over the other with regards to managing the particular media guidance application operation.

The criterion (or criteria) used by the media guidance application may be varied. For example, the criterion may indicate media guidance application operation types corresponding to performance capabilities of the first user device. For example, if a user device does not have a large screen size, the media guidance application may not generate for display an option or options that require a large screen size (e.g., program selection options that would require small text to be displayed). Instead, media guidance application may generate for display an option or options requiring a limited amount of screen space (e.g., a volume up/down icon).

In another example, the criterion may indicate media guidance application operation types only available on the target device. For example, some media guidance application operations (e.g., ordering pay-per-view content) may, in some cases, be too important to be delegated to any one user device. Accordingly, the media guidance application may require the media guidance application operation to be executed through the target device. Additionally or alternatively, the media guidance application may determine whether or not allowing the first user device conforms to parental control settings. For example, if the parental control settings indicate that a user (e.g., a child) associated with the first user device cannot manage the program selection, the media guidance application may not allow the first user device to manage the program selection.

In another example, the criterion may indicate media guidance application operation user preferences of a user associated with the first user device (or another device). For example, if the media guidance application determines that the user always controls (or manages) the volume of the target device, the media guidance application may determine that the first user device should manage the volume controls. Alternatively, if the media guidance application determines that a user associated with another device in the viewing area always controls (or manages) the volume of the target device, the media guidance application may not allow the first user device to manage the volume controls.

In another example, the criterion may be associated with media content currently presented on the target device. For example, if a media guidance application operation cannot be used (e.g., a fast-forward command during live programming), the media guidance application may determine that a user should not be given an option to manage such an operation.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
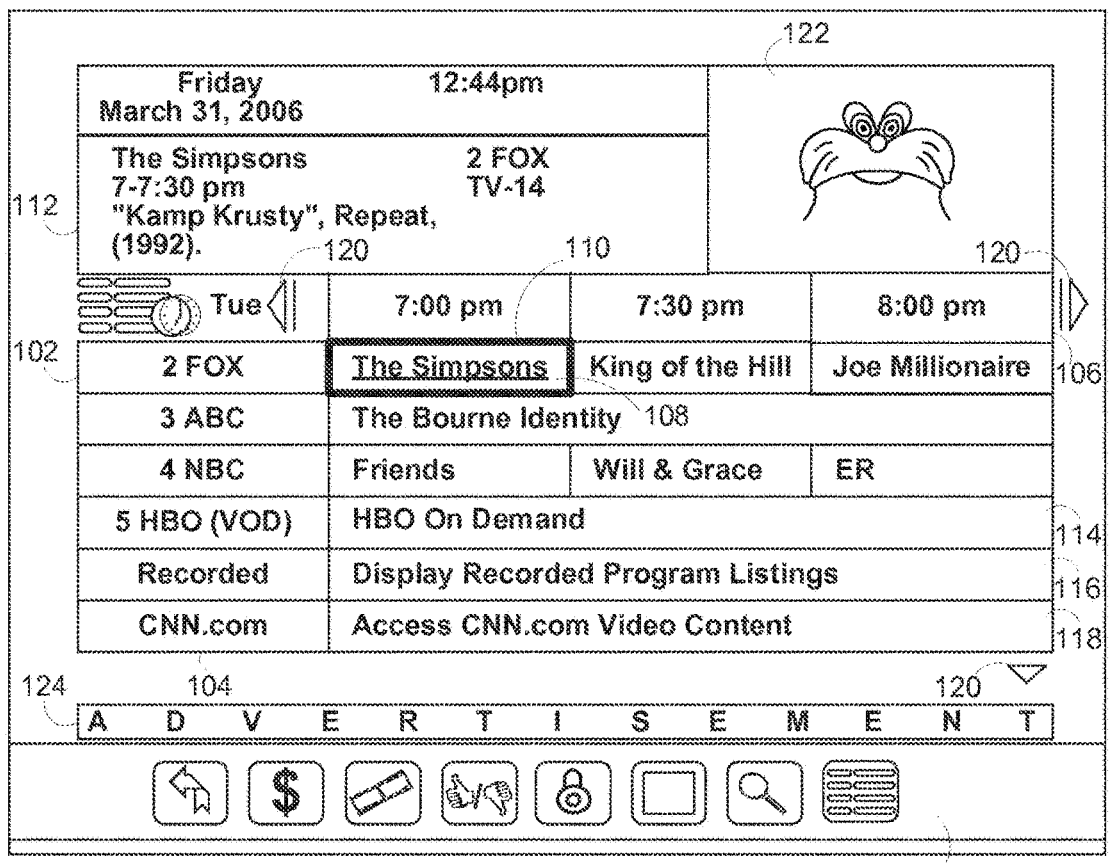
FIG. 1 shows an illustrative example of a display screen generated by a media guidance application in accordance with some embodiments of the disclosure.

Methods and systems are disclosed herein for a media guidance application that distributes media guidance application operations between multiple devices based on one or more criteria associated with those devices. For example, the media guidance application may determine that a target device (e.g., a first computer) may perform a first media guidance application operation (e.g., an option to post content to a social media network) and a second media guidance application operation (e.g., an option to record a program). The media guidance application may also determine that there are currently two devices available that may cause the target device to execute the media guidance application operations. The media guidance application may then distribute the media guidance application operations between the two devices (e.g., one device manages the first media guidance application operation and the other device manages the second media guidance application operation).

Additionally, the media guidance application may determine which of the devices should manage each media guidance application operation based on one or more criteria associated with each device. For example, one device may be associated with a user that prefers to manage the first media guidance application operation and the other device may be associated with a user that prefers to manage the second media guidance application operation. In such cases, the media guidance application may assign the first user device control over the first media guidance application operation and assign the second user device control over the second media guidance application operation.

As referred to herein, "a media guidance application," "interactive media guidance application," or "guidance application" is an application that allows a user to navigate through and access available media content. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, a wearable electronic device (e.g., computer glasses, computer watches, computer wristbands, etc.) or any other television equipment, computing equipment, or wireless device, and/or combination of the same.

In some embodiments, a user device may be referred to as a target device. As used herein, "a target device" is a user device for which a media guidance application operation, managed on a different user device, will be subject to. For example, if a first user device is currently managing a media guidance application operation for a second user device, then the second user device is the target device with respect to the first user device and the media guidance application operation.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, a media guidance application may determine (e.g., via control circuitry) that a first user device has entered a viewing area of a second user device. For example, the media guidance application may determine that one or more devices (e.g., a smartphone, tablet computer, wearable electronic device, etc.) are within a predetermined proximity to a target device (e.g., a set-top box and/or television).

As referred to herein, a "viewing area" is an area in which users consuming media on a user device are typically situated. A viewing area may be expressed in terms of particular structures (e.g., a room, house, etc.), may be defined as a distance (e.g., feet, meters, etc.) from a user device, or may be defined in terms of the accessibility of a media content (e.g., whether or not a user may connect to a router used to access the media content). Furthermore, the viewing area may be limited (or expanded) based on the location of objects that may affect the ability of a user to access a user device while in a viewing area (e.g., walls, doors, windows, etc.).

In some embodiments, the media guidance application may determine whether or not a user is within a viewing area of a user device based on whether or not the user is carrying or wearing the user device. For example, the media guidance application may determine that a user is within the viewing area of a smartphone if the user is currently holding the smartphone. In another example, the media guidance application may determine that the user is within the viewing area of a pair of computer glasses (or other wearable electronic device) if the user is currently wearing the user device.

In some embodiments, the media guidance application may use multiple techniques to determine whether or not a user is in and/or moving with respect to one or more viewing areas. For example, the media guidance application may incorporate and/or have access to one or more detection modules. For example, the media guidance application may incorporate global positioning systems, motion-detection systems, object-recognition systems, etc., in order to determine the presence of (or lack thereof) a user and/or user device.

For example, the media guidance application may use a global positioning system to determine where a user or user device is currently located. Furthermore, the media guidance application may cross-reference a database that indicates particular rooms (and the location of those particular rooms) with respect to a global positioning coordinate. For example, the media guidance application may receive a map or floor plan (e.g., inputted by the user or received from a remote source) that described the geographic limits of each viewing area, user devices within a viewing area, etc. The media guidance application may then cross-reference global position coordinates received from a device to determine whether or not the device is within a viewing area.

In another example, the media guidance application may use a motion-detecting system to determine whether or not a user and/or user device has entered a viewing area. In response to detecting that a user and/or user device has entered a viewing area, the media guidance application may ping the user device to determine whether or not the user device is suitable for managing media guidance application operations.

In another example, the media guidance application may determine that a user and/or user device has entered a viewing area based on whether or not the user device is acknowledged and/or verified. For example, the media guidance application may determine whether or not the user device is currently connected to a home Wi-Fi network. If so, the media guidance application may determine the user device that is connected is within the viewing area of a target device.

In another example, the media guidance application may determine that a user and/or user device has entered a viewing area using object recognition. For example, the media guidance application may incorporate and/or have access to a content recognition module. The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique to monitor the appearance (or lack thereof) of one or more users and/or user devices. For example, the media application may receive data in the form of a video of the viewing area. The video may include a series of frames. For each frame of the video, the media application may use a content recognition module or algorithm to detect the users and/or user devices in each of the frames or series of frames.

In some embodiments, the content recognition module or algorithm may also include speech recognition techniques, including but not limited to Hidden Markov Models, dynamic time warping, and/or neural networks (as described above) to translate spoken words into text and/or processing audio data. For example, the content recognition module may listen for sounds that may indicate a user and/or user device is in a viewing area.

In addition, the media application may use multiple types of optical character recognition and/or fuzzy logic, for example, when processing keyword(s) retrieved from data (e.g., textual data, translated audio data, user inputs, etc.). For example, the media guidance application may analyze barcodes, serial numbers, etc. in order to identify a user device. The media guidance application may further use a search function and/or fuzzy logic. For example, using fuzzy logic, the media application (e.g., via a content recognition module or algorithm incorporated into, or accessible by, the media application) may determine two fields and/or values to be identical even though the substance of the data or value (e.g., two different spellings of a potential destination) is not identical.

In some embodiments, in response to determining that the first user device has entered the viewing area of the second user device, the media guidance application may select (e.g., via control circuitry) a media guidance application operation available on the second user device. For example, the media guidance application may access a database (e.g., located at storage circuitry) that lists all the media guidance applications that are currently available or will become available for performance on the target device.

As referred to herein, a "media guidance application operation" refers to any operation that may be performed by a target device. For example, a media guidance application operation may correspond to providing, receiving, recording, and/or generating for display media assets and/or media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., when generating a user and/or device profile for the user and/or user device).

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the playback operation plays back the media asset at normal playback speed.

Still other operations of a media guidance application may include the modification of the video, audio, and/or other settings of a target device. For example, a media guidance application operation may include turning a device on and off, raising the volume associated with a device, adjusting the display settings of a device, assigning parental controls, transferring information (e.g., messages) from one device to another, storing and/or recording content, entering authorization information and/or payment information, etc.

In some embodiments, a media guidance application operation may relate to a social media activity such as publicly distributing information associated with a user. For example, the media guidance application may retrieve a list of entities such as friends (e.g., a social network buddy list), contacts (e.g., retrieved from a phone/text message/e-mail account associated with the user), social networks, and/or public services (e.g., hospitals, police departments, schools, etc.) with known associations to the user or the community of the user and generate for display information (e.g., content posted on a social network, e-mails received by an account of a user, targeted advertisements, etc.).

For example, the media guidance application may present an option to post content to a social network about the media content currently presented by a target device. Additionally or alternatively, the media guidance application may present an option to receive content received from a social network and/or over the Internet about the media content currently presented by a target device.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

In some embodiments, the media guidance application may retrieve a device profile (e.g., from storage circuitry) for the first user device that lists a criterion for options, presented on the first user device, for performing media guidance application operations on the second user device. For example, a device profile may store one or more criteria that the media guidance application may use to determine what, if any, media guidance application operations for the target device should be managed by the first user device.

As used herein, a "device profile" is a collection of information about a particular device. Likewise, a "user profile" is a collection of information about a particular user. The information included in a profile may be varied and describe any aspect relating a user, device, interaction between a user and a device, and/or an interaction with the user or device and media content. It should be noted that a user profile may incorporated information from a device profile or may incorporate a device profile itself. Likewise, a device profile may incorporated information from a user profile or may incorporate a user profile itself.

For example, a user device may track particular media content consumed (or not consumed) by a user. Likewise, a user device may track particular media content accessed (or not accessed) by the device. The user/device profile may also include authorizations (e.g., passwords, subscription information, etc.), associations (e.g., users associated with a particular device and devices associated with a particular user), characteristics about the user (e.g., demographic information, preferences, known associations, etc.) and the device (e.g., performance capabilities, model number, brand, display screen size, resolution, format, operating systems, and/or any other information about the functioning of the device).

In some embodiments, the user/device profile may include priority designation for the user and/or user device. For example, the priority designation may indicate how to resolve conflicts (e.g., such as two user devices requesting the option to manage the performance of the same media guidance application operation on a target device). In such cases, the user and/or user device with a higher priority may have the conflict resolved in its favor. In some embodiments, the user/device profile may further indicate the relationship of one user and/or user device to another user and/or user device. For example, the user/device profile may indicate which user or user device should have priority over a particular target device and/or media guidance application operation for that target device.

In some embodiments, the priority for each user and/or user device may change depending on the current circumstances. For example, the priority designation may change based on the current time, content on the target device, length of time each user/device has been accessing content, which user/device accessed the target device and/or managed the operation first, etc.

In some embodiments, the user and/or device profiles may indicate particular criteria for use in selecting a media guidance application operation for performance on a target device for management on the user device. The criterion (or criteria) used by the media guidance application may be varied. For example, the criterion may indicate media guidance application operation types corresponding to performance capabilities of the first user device. For example, if a user device does not have a large screen size, the media guidance application may not generate for display an option or options that require a large screen size (e.g., program selection options that would require small text to be displayed). Instead, the media guidance application may generate for display an option or options requiring a limited amount of screen space (e.g., a volume up/down icon). Furthermore, the criterion may indicate particular media guidance application operations that conform (or do not conform) to the performance capabilities, model number, brand, display screen size, resolution, format, operating systems, and/or any other functions of the device.

In another example, the criterion may indicate media guidance application operation types available only on the target device. For example, some media guidance application operation (e.g., ordering pay-per view content) may, in some cases, be too important to be delegated to any one user device. Accordingly, the media guidance application may require the media guidance application operation to be executed through the target device. Additionally or alternatively, the media guidance application may determine whether or not to allow the first user device to conform to parental control settings. For example, if the parental control settings indicate that a user (e.g., a child) associated with the first user device cannot manage the program selection, the media guidance application may not allow the first user device to manage the program selection.

In another example, the criterion may indicate media guidance application operation user preferences of a user associated with the first user device (or another device). For example, if the media guidance application determines that the user always controls (or manages) the volume of the target device, the media guidance application may determine that the first user device should manage the volume controls. Alternatively, if the media guidance application determines that a user associated with another device in the viewing area always controls (or manages) the volume of the target device, the media guidance application may not allow the first user device to manage the volume controls.

In another example, the criterion may be associated with media content currently presented on the target device. For example, if a media guidance application operation cannot be used (e.g., a fast-forward command during live programming), the media guidance application may determine that a user should not be given an option to manage such an operation.

In another example, the criterion may outline rules for the management of a media guidance application operation with respect to the management of the media guidance application operation on other user devices. For example, the media guidance application may consider whether or not other devices are currently in the viewing area of the target device and whether or not those other devices are currently managing one or more media guidance application operations for the target device when determining whether or not a current user device should manage a particular media guidance application operation. For example, if the media guidance application determines that an option for a particular media guidance application operation is already generated for display on a third user device (or already generated for display on a maximum number of other devices), the media guidance application may select a different media guidance application operation available for the target device for the third user device to manage. In such cases, the media guidance application may cause an option associated with the different media guidance application operation to be generated for display on the third user device.

In another example, if the media guidance application determines that an option for a particular media guidance application operation is already generated for display on a third user device (or already generated for display on a maximum number of other devices), the media guidance application may determine whether or not to stop generating for display the option on the third user device and start generating for display the option on the first user device. For example, the media guidance application may compare priority designations associated with each of the first user device and the third user device to determine which device should have priority over the other with regards to managing the particular media guidance application operation.

In some embodiments, the media guidance application may compare the media guidance application operation to the criterion to determine whether or not to present an option, on the first user device, for performing the media guidance application operation on the second user device. For example, the media guidance application may determine whether or not the media guidance application operation for the target device should be managed by the first user device. The media guidance application may base the determination on whether or not the media guidance application operation meets the criteria.

For example, the media guidance application may cross-reference the media guidance application operation with a database listing criteria met (or not met) by the media guidance application operation to determine whether the media guidance application operation meets the criterion. In another example, for a given media guidance application operation, the media guidance application may determine quantifiable characteristics of the media guidance application operation. For example, a media guidance application operation may correspond to a record program operation, and the criterion may correspond to whether or not an operation can currently be used. If the target device is currently presenting on-demand content that cannot be recorded, the media guidance application may determine that the criterion is not met. Accordingly, the media guidance application may prevent an option for the operation on the first user device.

In some embodiments, the media guidance application may generate for display on the first user device the option based on the comparison. For example, if the media guidance application determines that the first user device should manage the media guidance application operation for the target device, the media guidance application may cause an option for that media guidance application operation to appear on a display screen associated with the first user device.

In some embodiments, the options may be presented as audio, video, and/or textual cues as to the nature of the option. For example, the option may include a title or description of the media guidance application operation and/or device associated with the option. Likewise, the option may be grouped with options of a similar type or functions and/or arranged as the options would appear in the target device.

Figure 2:
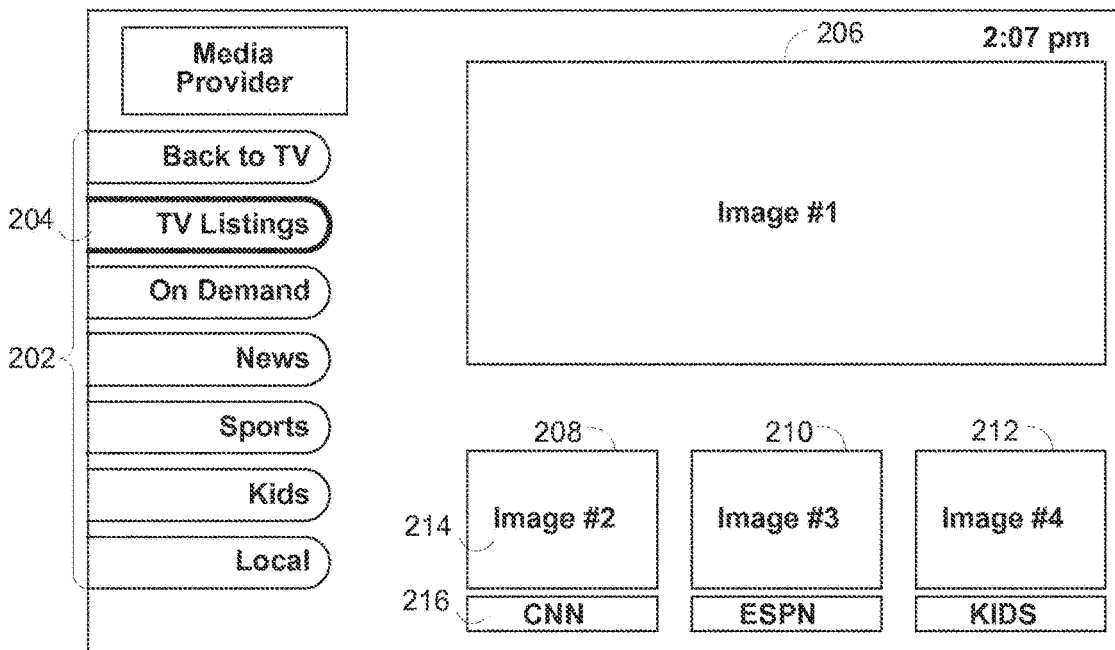
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
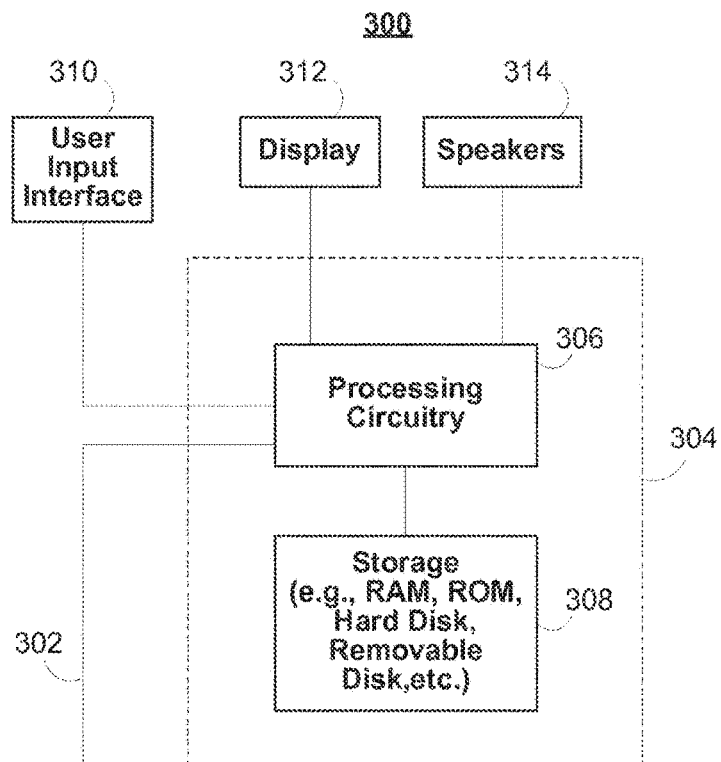
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
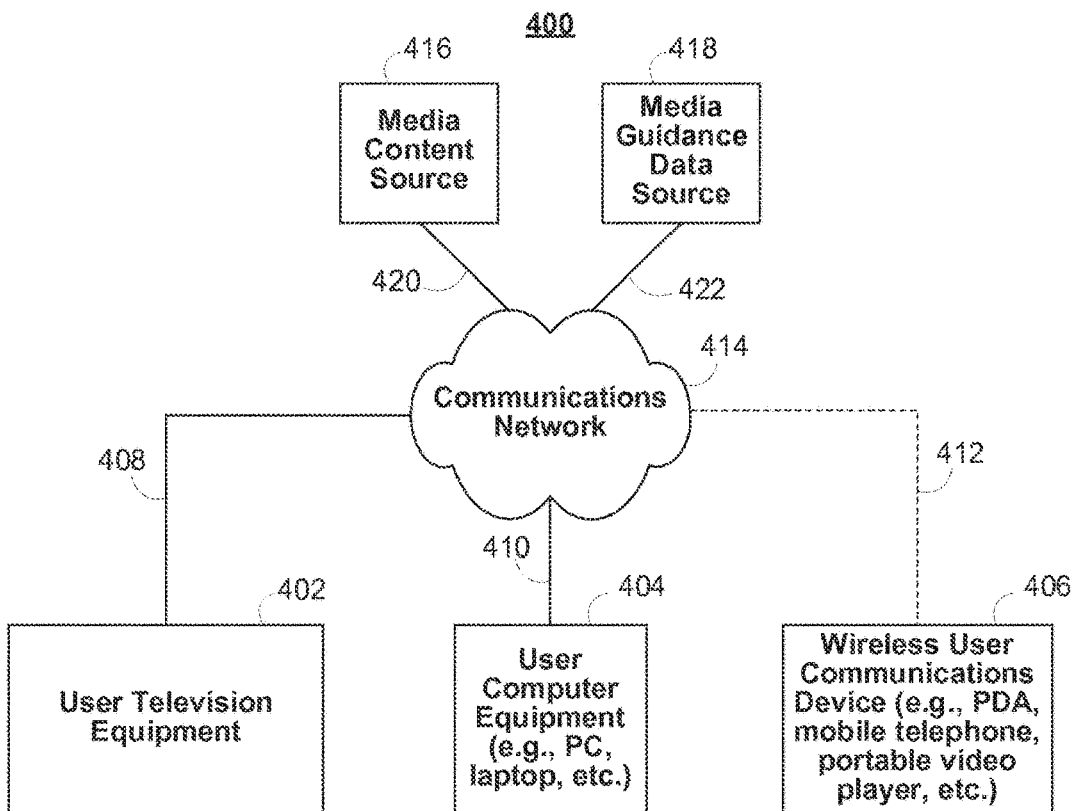
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first user device. In some embodiments, the second screen device provides an interface for adjusting settings and display preferences of the first user device. In some embodiments, the second screen device is configured for interacting with other second screen devices or for interacting with a social network. The second screen device can be located in the same room as the first user device, a different room from the first user device but in the same house or building, or in a different building from the first user device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mob46193155_1ile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
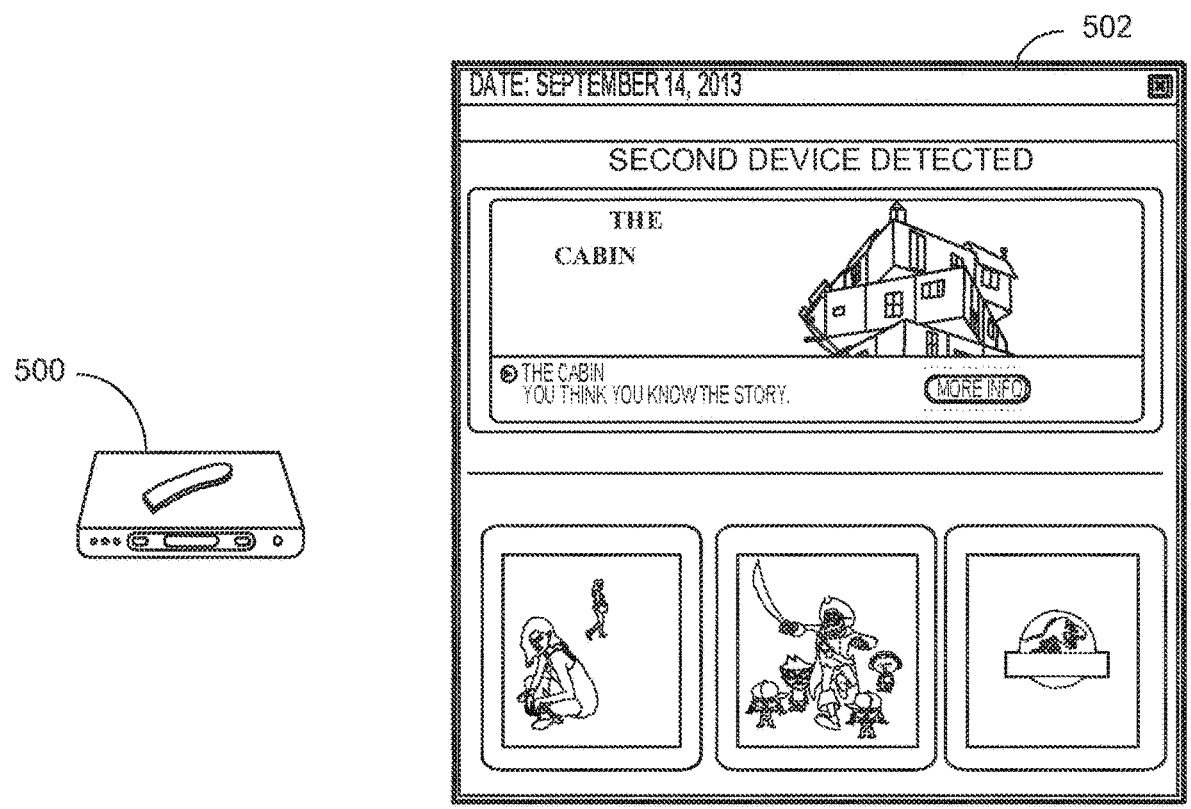
FIG. 5 shows an illustrative example of a distribution of controls for media guidance application operations for a target device among multiple user devices in accordance with some embodiments of the disclosure.
Figure 5:
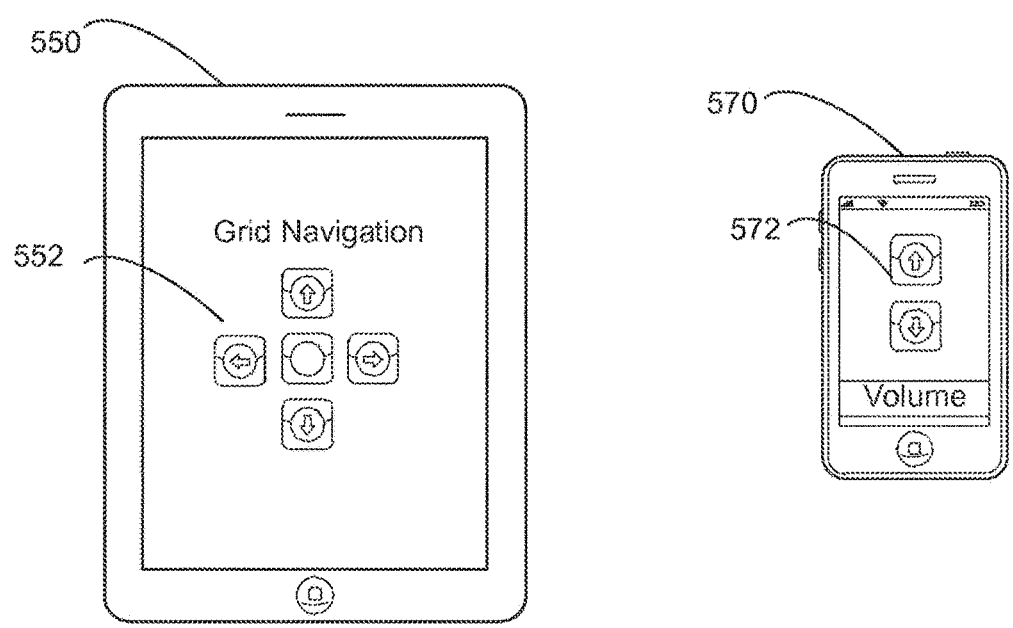

FIG. 5 shows an illustrative example of a distribution of controls for media guidance application operations for a target device among multiple user devices. For example, FIG. 5 shows three user devices (e.g., user device 500, user device 550, and user device 570). As shown in FIG. 5, user device 500 is currently presenting content on display screen 502.

In FIG. 5, the media guidance application has detected two other devices in the viewing area. For example, the media guidance application has detected user device 550 and user device 570. In response to this detection, the media guidance application has generated for display options to perform a media guidance application operation on user device 500 (and thus affect the media content presented on display screen 502). For example, user device 550 is currently generating for display option 552, which relates to grid navigation. Likewise, user device 570 is currently generating for display option 572, which relates to volume control.

The media guidance application may select the media guidance application operations generated for display on user device 550 and 570 using various means. For example, the media guidance application implemented on any one or more of user devices 500, 550, and/or 570 may select the options generated for display on user device 550 and 570 based on one or more criteria. For example, user device 570 does not have a large screen size; therefore, the media guidance application may have determined (e.g., via control circuitry 304 (FIG. 3)) to generate for display an option that did not require a large screen size (volume controls). Likewise, the media guidance application may generate for display an option requiring a large amount of screen space (e.g., navigation controls) on user device 550 as user device 550 has a larger display.

Alternatively or additionally, the media guidance application may have used other criteria to select the options presented on each of the user devices. For example, the media guidance application may distribute the media guidance application operation based on the importance of the operation and/or the frequency of use of each option. For example, a frequently used option may be distributed to various devices before less frequently used operations.

Figure 6:
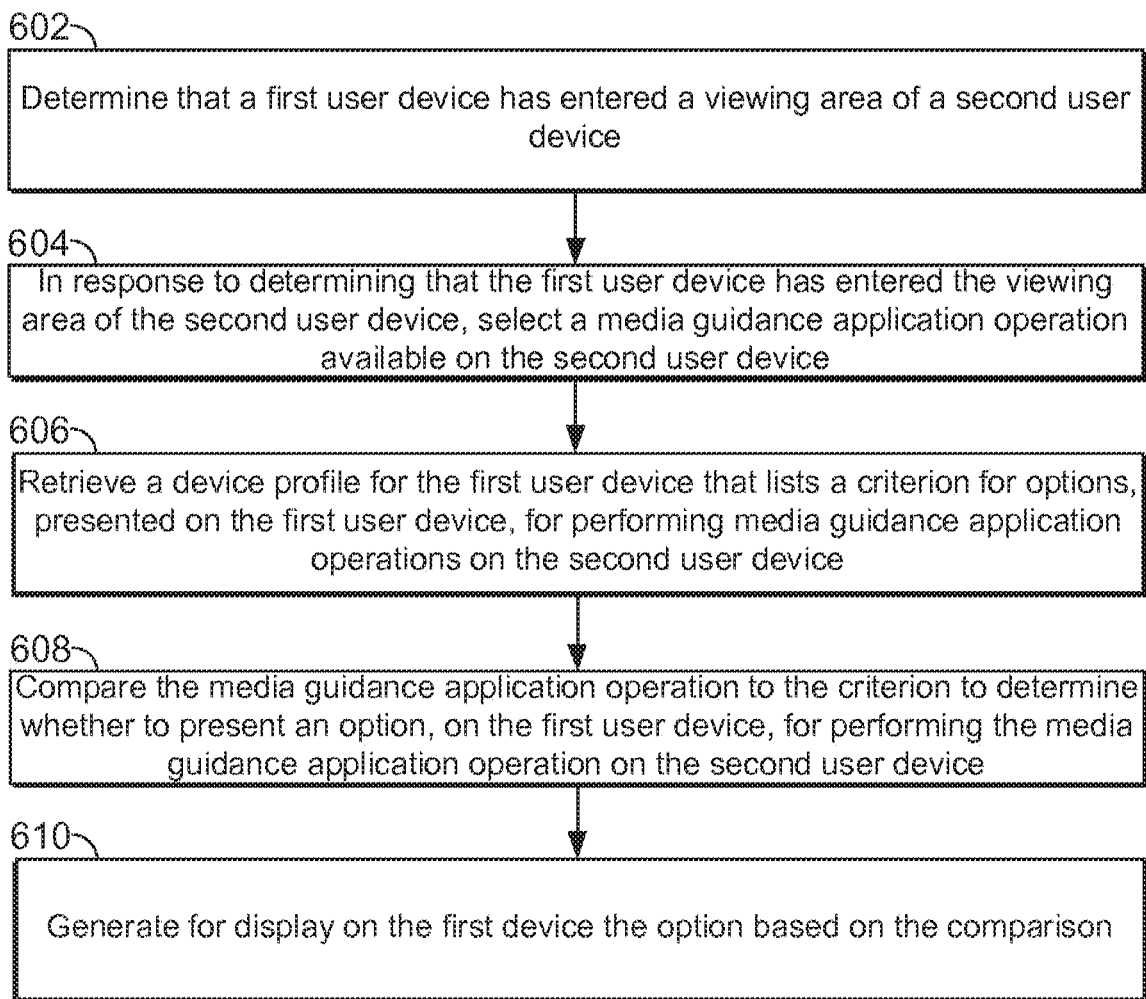
FIG. 6 is a flowchart of illustrative steps for generating, on a first user device, an option to perform a media guidance application operation on a second user device in accordance with some embodiments of the disclosure.

FIG. 6 is a flowchart of illustrative steps for distributing control of media guidance application operations for a target device among multiple user devices. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7)).

At step 602, a media guidance application determines (e.g., via control circuitry 304 (FIG. 3)) that a first user device (e.g., user device 550 (FIG. 5)) has entered a viewing area of a second user device (e.g., user device 502 (FIG. 5)). For example, the media guidance application may determine (e.g., via control circuitry 304 (FIG. 3)) that one or more devices (e.g., a smartphone, tablet computer, wearable electronic device, etc.) are within a predetermined proximity to a target device (e.g., a set-top box and/or television).

At step 604, in response to determining that the first user device has entered the viewing area of the second user device, the media guidance application selects (e.g., via control circuitry 304 (FIG. 3)) a media guidance application operation available on the second user device (e.g., user device 502 (FIG. 5)). For example, the media guidance application may access a database (e.g., located at storage 308 and/or any location accessible via communications network 414 (FIG. 4)) that lists all the media guidance applications that are currently available or will become available for performance on the target device (e.g., user device 502 (FIG. 5)).

At step 606, the media guidance application retrieves (e.g., via control circuitry 304 (FIG. 3)) a device profile (e.g., from storage 308 and/or any location accessible via communications network 414 (FIG. 4)) for the first user device (e.g., user device 550 (FIG. 5)) that lists a criterion for options (e.g., option 552 (FIG. 5)), presented on the first user device, for performing media guidance application operations on the second user device (e.g., user device 502 (FIG. 5)). For example, a device profile may store one or more criteria that the media guidance application may use to determine (e.g., via control circuitry 304 (FIG. 3)) what, if any, media guidance application operations for the target device should be managed by the first user device.

At step 608, the media guidance application compares (e.g., via control circuitry 304 (FIG. 3)) the media guidance application operation (e.g., grid navigation controls) to the criterion to determine whether or not to present an option (e.g., option 552 (FIG. 5)), on the first user device (e.g., user device 550 (FIG. 5)), for performing the media guidance application operation on the second user device (e.g., user device 502 (FIG. 5)). For example, the media guidance application may determine whether or not the media guidance application operation for the target device should be managed by the first user device. The media guidance application may base the determination on whether or not the media guidance application operation meets the criteria.

For example, the media guidance application may (e.g., via control circuitry 304 (FIG. 3)) cross-reference the media guidance application operation with a database (e.g., located at storage 308 (FIG. 3) and/or any location accessible via communications network 414 (FIG. 4)) listing criteria met by the media guidance application operation to determine whether the media guidance application operation meets the criterion.

At step 610, the media guidance application generates for display on the first user device (e.g., user device 550 (FIG. 5)) the option based on the comparison. For example, if the media guidance application determines (e.g., via control circuitry 304 (FIG. 3)) that the first user device should manage the media guidance application operation for the target device (e.g., user device 502 (FIG. 5)), the media guidance application may cause an option (e.g., option 552 (FIG. 5)) for that media guidance application operation to appear on a display screen associated with the first user device.

The criterion (or criteria) used by the media guidance application may be varied. For example, the criterion may indicate media guidance application operation types corresponding to performance capabilities of the first user device. For example, if a user device does not have the graphical capabilities to generate for display an interactive option, the media guidance application may not generate the option for display. Instead, the media guidance application may generate for display an option that does not require graphic capabilities.

In another example, the criterion may indicate media guidance application operation types available only on the target device. For example, some media guidance application operations (e.g., resetting parental controls) may, in some cases, be too important to be delegated to any one user device. Accordingly, the media guidance application may require the media guidance application operation to be executed through the target device.

In another example, the criterion may indicate media guidance application operation user preferences of a user associated with the first user device (or another device). For example, if the media guidance application determines that the first user device frequently posts content on social media networks, the media guidance application may determine that the first user device should manage media guidance application operations related to social media. Alternatively, if the media guidance application determines that the first user device never uses social media (or is not associated with a social media account), the media guidance application may not allow the first user device to manage operations related to social media.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
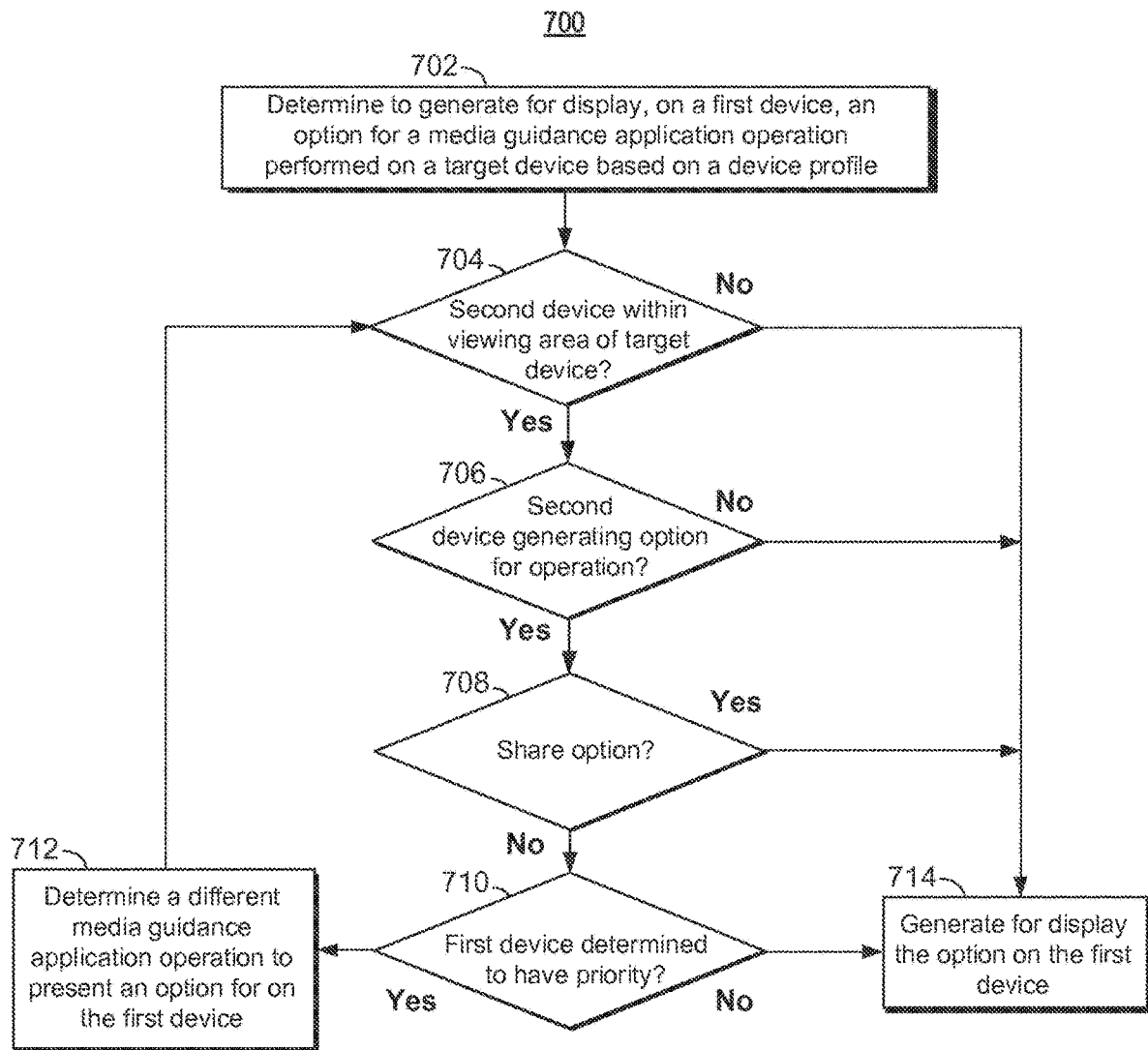
FIG. 7 is a flowchart of illustrative steps for distributing control of media guidance application operations for a target device among multiple user devices in accordance with some embodiments of the disclosure.

FIG. 7 is a flowchart of illustrative steps for distributing control of media guidance application operations for a target device among multiple user devices. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6)).

At step 702, the media guidance application determines (e.g., via control circuitry 304 (FIG. 3)) to generate for display, on a first user device (e.g., user device 550 (FIG. 5)), an option (e.g., option 552 (FIG. 5)) for a media guidance application operation performed on a target device (e.g., user device 500 (FIG. 5)) based on a device profile. For example, as discussed above in relation to process 600 (FIG. 6)), the media guidance application may compare (e.g., via control circuitry 304 (FIG. 3)) the media guidance application operation (e.g., grid navigation controls) to the criterion associated with a user device (e.g., user device 550 (FIG. 5)) to determine whether or not to present an option (e.g., option 552 (FIG. 5)), on the first user device (e.g., user device 550 (FIG. 5)), for performing the media guidance application operation on a target device (e.g., user device 502 (FIG. 5)).

At step 704, the media guidance application determines (e.g., via control circuitry 304 (FIG. 3)) whether or not there is a second user device (e.g., user device 570 (FIG. 5)) within the viewing area of the target device (e.g., user device 500 (FIG. 5)). For example, the media guidance application may consider (e.g., via control circuitry 304 (FIG. 3)) whether or not other devices (e.g., user device 570 (FIG. 5)) are currently in the viewing area of the target device (e.g., user device 502 (FIG. 5)) and whether or not those other devices are currently managing one or more media guidance application operations (e.g., via an on-screen option) for the target device (e.g., user device 502 (FIG. 5)). For example, if the media guidance application determines (e.g., via control circuitry 304 (FIG. 3)) that an option (e.g., option 552 (FIG. 5)) for a particular media guidance application operation is already generated for display on a second user device (e.g., user device 552 (FIG. 5)), or already generated for display on a maximum number of other devices, the media guidance application may select a different media guidance application operation (e.g., associated with option 575 (FIG. 5)) available for the target device for the second user device to manage. In such cases, the media guidance application may cause an option associated with the different media guidance application operation to be generated for display on the third user device.

If the media guidance application determines (e.g., via control circuitry 304 (FIG. 3)) that there is not another device within the viewing area, the media guidance application proceeds to step 714 and generates for display the option of the first user device. For example, the media guidance application may cause an option (e.g., option 552 (FIG. 5)) for that media guidance application operation to appear on a display screen associated with the first user device (e.g., user device 500 (FIG. 5)). In contrast, if the media guidance application determines (e.g., via control circuitry 304 (FIG. 3)) that there is another device within the viewing area, the media guidance application proceeds to step 706.

At step 706, the media guidance application determines (e.g., via control circuitry 304 (FIG. 3)) whether the second user device (e.g., user device 570 (FIG. 5)) is generating the option for the operation. For example, if the media guidance application determines (e.g., via control circuitry 304 (FIG. 3)) that an option for a particular media guidance application operation is already generated for display on a second user device (or already generated for display on a maximum number of other devices), the media guidance application may determine (e.g., via control circuitry 304 (FIG. 3)) whether or not to stop generating for display the option on the second user device and start generating for display the option on the first user device.

If the media guidance application determines (e.g., via control circuitry 304 (FIG. 3)) that the second user device is not generating for display the option for the operation, the media guidance application proceeds to step 714 and generates for display the option of the first user device. In contrast, if the media guidance application determines (e.g., via control circuitry 304 (FIG. 3)) the second user device is generating the option for the operation, the media guidance application proceeds to step 708.

At step 708, the media guidance application determines (e.g., via control circuitry 304 (FIG. 3)) whether or not the two devices may share the option. For example, the media guidance application may generate for display the same option (e.g., option 572 (FIG. 5)) on both user devices (e.g., user device 550 (FIG. 5) and user device 570 (FIG. 5)). If the media guidance application determines (e.g., via control circuitry 304 (FIG. 3)) that the devices may share the option, the media guidance application proceeds to step 714, and generates for display the option of the first user device. In contrast, if the media guidance application determines (e.g., via control circuitry 304 (FIG. 3)) that the device may not share the option, the media guidance application proceeds to step 710.

For example, in some embodiments, the media guidance application may not allow a user device to share options in order to prevent conflicts forming over the user of the options. Alternatively or additionally, the media guidance application may not allow user device to share options while options are still waiting to be distributed. For example, the media guidance application may attempt to distribute all the media guidance application operations available on a target device (e.g., user device 500 (FIG. 5)) to other devices. In some embodiments, whether or not options may be shared may be a based on the number of user devices within the viewing area.

At step 710, the media guidance application determines (e.g., via control circuitry 304 (FIG. 3)) whether or not the first user device has priority over the option. For example, the media guidance application may compare priority designations associated with each of the first user device (e.g., user device 550 (FIG. 5)) and the second user device (e.g., user device 570 (FIG. 5)) to determine which device should have priority over the other with regards to managing the particular media guidance application operation.

If the media guidance application determines (e.g., via control circuitry 304 (FIG. 3)) that the first user device does have priority, the media guidance application proceeds to step 714 and generates for display the option of the first user device. In contrast, if the media guidance application determines (e.g., via control circuitry 304 (FIG. 3)) that the first user device does not have priority, the media guidance application proceeds to step 712 and determines a different media guidance application operation to present an option for on the first user device before returning to step 704.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    detecting a request from a first device to control a media application running on a second device;
    identifying a size of a display screen of the first device;
    based at least in part on the size of the display screen, selecting a set of user interface elements for controlling the media application running on the second device, wherein the selecting comprises:
        identifying at least one user interface element for which a particular display screen size is required; and
        refraining from selecting the identified at least one user interface element for display on the first device based on the size of the display screen being less than the particular display screen size; and
    generating for display on the display screen of the first device the selected set of user interface elements for controlling the media application running on the second device.

2. The method of claim 1, wherein the identifying the size of the display screen of the first device comprises:
    determining that the size of the display screen is larger than the particular display screen size; and
    wherein the selecting the set of user interface elements for controlling the media application running on the second device further comprises:
        in response to the determining that the size of the display screen is larger than the particular display screen size, selecting additional user interface elements to include in the set of user interface elements.

3. The method of claim 1, wherein the set of user interface elements corresponds to one or more of volume, trick play, playback, or content recording operations.

4. The method of claim 1, wherein the first device and the second device are communicatively coupled to a communications network.

5. A system comprising:
    control circuitry configured to:
        detect a request from a first device to control a media application running on a second device;
        identify a size of a display screen of the first device;
        based at least in part on the size of the display screen, select a set of user interface elements for controlling the media application running on the second device, wherein the selecting comprises:
            identifying at least one user interface element for which a particular display screen size is required; and
            refraining from selecting the identified at least one user interface element for display on the first device based on the size of the display screen being less than the particular display screen size; and
    input/output circuitry configured to:
        generate for display on the display screen of the first device the selected set of user interface elements for controlling the media application running on the second device.

6. The system of claim 5, wherein the control circuitry is further configured to identify the size of the display screen of the first device by:
    determining that the size of the display screen is larger than the particular display screen size; and
    wherein the control circuitry is further configured to select the set of user interface elements for controlling the media application running on the second device by:
        in response to the determining that the size of the display screen is larger than the particular display screen size, selecting additional user interface elements to include in the set of user interface elements.

7. The system of claim 5, wherein the set of user interface elements corresponds to one or more of volume, trick play, playback, or content recording operations.

8. The system of claim 5, wherein the first device and the second device are communicatively coupled to a communications network.

9. A non-transitory computer readable medium comprising:

instructions that when executed by control circuitry cause the control circuitry to:
- detect a request from a first device to control a media application running on a second device;
- identify a size of a display screen of the first device;
- based at least in part on the size of the display screen, select a set of user interface elements for controlling the media application running on the second device, wherein the selecting comprises:
  - identifying at least one user interface element for which a particular display screen size is required; and
  - refraining from selecting the identified at least one user interface element for display on the first device based on the size of the display screen being less than the particular display screen size; and
- instructions that when executed by the control circuitry cause input/output circuitry to:
  - in response to determining that the first device is located within a predetermined proximity of the second device, generate for display on the display screen of the first device the selected set of user interface elements for controlling the media application running on the second device.

10. The non-transitory computer readable medium of claim 9, further comprising instructions that when executed by the control circuitry cause the control circuitry to identify the size of the display screen of the first device by:
- determining that the size of the display screen is larger than the particular display screen size; and
- wherein the instructions that when executed by the control circuitry further cause the control circuitry to select the set of user interface elements for controlling the media application running on the second device by:
  - in response to the determining that the size of the display screen is larger than the particular display screen size, selecting additional user interface elements to include in the set of user interface elements.

11. The non-transitory computer readable medium of claim 9, wherein the set of user interface elements corresponds to one or more of volume, trick play, playback, or content recording operations.

12. The non-transitory computer readable medium of claim 9, wherein the first device and the second device are communicatively coupled to a communications network.

13. The method of claim 1, further comprising:
- identifying at least one additional user interface element compatible with a display screen below the particular display screen size; and
- generating for display on the display screen of the first device the at least one additional user interface element.

14. The system of claim 5, wherein the control circuitry is further configured to identify at least one additional user interface element compatible with a display screen below the particular display screen size, and
- wherein the input/output circuitry is further configured to generate for display on the display screen of the first device the at least one additional user interface element.

15. The non-transitory computer readable medium of claim 9, further comprising instructions that when executed by the control circuitry cause the control circuitry to:
- identify at least one additional user interface element compatible with a display screen below the particular display screen size; and
- generate for display on the display screen of the first device the at least one additional user interface element.

* * * * *